INVENTOR
R.D. STANDLEY

United States Patent Office 3,543,189
Patented Nov. 24, 1970

1

3,543,189
CONSTANT-IMPEDANCE CHANNEL-DROPPING FILTER
Robert D. Standley, Shrewsbury, N.J., assignor to Bell Telephone Laboratories, Incorporated, Murray Hill and Berkeley Heights, N.J., a corporation of New York
Filed Jan. 27, 1969, Ser. No. 793,934
Int. Cl. H01p 1/20, 5/12
U.S. Cl. 333—6                                                                 3 Claims

ABSTRACT OF THE DISCLOSURE

This application discloses a constant-impedance, four-port, channel-dropping filter for use in a circular electric mode transmission system. A section of waveguide is wrapped around a section of circular waveguide to form a resonant loop tuned to the frequency of the channel to be dropped. The circular waveguide, supportive of a plurality of propagating channels in the $TE_{01}^{\circ}$ mode, is coupled to the resonant loop in a manner to induce selectively therein a traveling wave at the frequency to be dropped. An output waveguide is directionally coupled to the resonant loop for extracting the dropped channel.

This invention relates to a constant-impedance channel-dropping filter.

BACKGROUND OF THE INVENTION

In my United States Pat. 3,441,878 a class of channel-dropping filters is described that is particularly adapted for use in electromagnetic wave transmission systems supportive of the $TE_{01}^{\circ}$ circular electric mode of wave propagation. Each of the embodiments disclosed, however, is a three port device and, as such, is narrow band since all three ports cannot be impedance-matched over an extended frequency range. Theoretically, only the input port can be impedance-matched over a broad frequency band. In practice, the situation is less favorable in that all ports tend to be mismatched and, in particular, the input port tends to be badly mismatched at the frequency of the channel that is to be dropped.

It is, accordingly, the broad object of the present invention to broaden the band of frequencies over which a channel-dropping filter is impedance-matched.

It is a further object of the invention to provide a channel-dropping filter whose selectivity can be easily controlled.

SUMMARY OF THE INVENTION

The above-enumerated objectives are realized in a four-port channel-dropping filter adapted for use in a circular waveguide transmission system supportive of the $TE_{01}^{\circ}$ circular electric mode of wave propagation. In accordance with the present invention, a traveling wave resonator is wrapped about and directionally coupled to a section of circular waveguide so as to selectively extract from said circular waveguide the channel that is to be dropped. An output waveguide is directionally-coupled to the resonator.

It is an advantage of the present invention that because it is a four-port filter, rather than a three-port filter, all four ports can be impedance-matched over a much greater frequency range. As a result, the input reflection coefficient is essentially zero over the entire frequency band of interest.

It is a further advantage of the present invention that the filter selectivity can be easily increased by cascading additional resonator cavities between the circular waveguide and the dropped-channel output waveguide.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
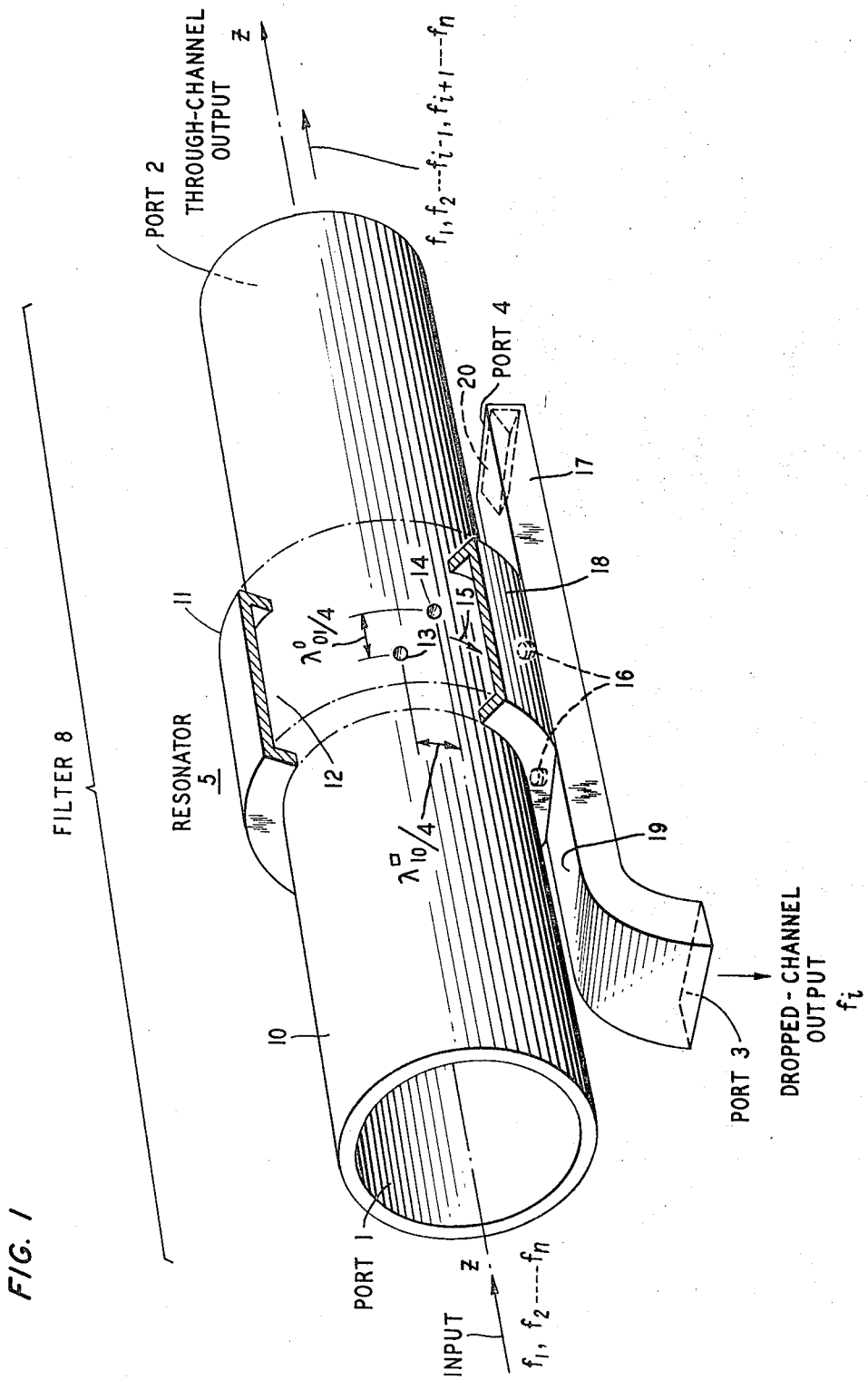
FIG. 1 shows a first embodiment of a four-port channel-dropping filter in accordance with the invention.

Referring to the drawings, FIG. 1 shows a first embodiment of a four-port channel-dropping filter 8, in accordance with the present invention, comprising a section of circular waveguide 10 directionally coupled to a section of rectangular waveguide 11 that is wrapped around waveguide 10 to form a closed loop resonator 5. Resonator 5 is, in turn, directionally coupled to an output waveguide 17.

The section of circular waveguide 10 is proportioned to support the lowest order circular electric mode, i.e., the $TE_{01}^{\circ}$ mode of wave propagation, over a band of frequencies which extends between $f_1$ and $f_n$, and to be non-supportive over this band of any of the higher order circular electric modes.

The channel to be dropped is extracted from the circular waveguide by means of resonant loop 5 formed by rectangular waveguide 11 wrapped about the outer periphery of circular waveguide 10 such that the wide walls of waveguide 11 are parallel to the longitudinal axis Z—Z of waveguide 10. In the illustrative embodiment of FIG. 1, a portion 12 of circular waveguide 10 is shared in common with rectangular waveguide 11 and forms the inner wide wall of guide 11.

Waveguide 11 is a dominant mode waveguide whose cross-sectional dimensions are proportioned to support only the $TE_{10}^{\square}$ mode of wave propagation. In addition, waveguide 11 forms a closed resonant loop whose electrical length is equal to an integral number $m$ of rectangular guide wavelength ($m\lambda^{\square}$) at the frequency, $f_i$, of the channel to be dropped. The electrical length of the loop is, of course, determined by its physical length and the phase velocity of the wave energy within waveguide 11. The former is a function of the diameter of waveguide 10 while the latter is a function primarily of the wide dimension of guide 11. These two parameters are, accordingly, selected to produce the desired loop length. Where necessary or desirable, dielectric loading can also be employed within waveguide 11 to assist in tuning the loop to obtain the desired resonant condition.

Wave energy at the resonant frequency $f_i$ is coupled out of waveguide 10 and into waveguide 11 in a manner to induce a traveling wave in guide 11. This can be done in any one of a variety of ways such as are shown, for example, in U.S. Pats. 2,472,274, 2,062,859, 2,870,419, and 2,898,559. For purposes of illustration, directional coupling between waveguides 10 and 11 in the embodiment of FIG. 1 is achieved by means of two apertures 13 and 14 which extend through wall portion 12. The apertures are longitudinally spaced a quarter of a circular guide wavelength apart along guide 10, and longitudinally spaced a quarter of a rectangular guide wavelength along guide 11. These are designated $\lambda_{01}^{\circ}/4$ and $\lambda_{10}\square/4$ respectively in FIG. 1. In addition, the two apertures are symmetrically located on opposite sides of the center of guide 11. So disposed, a $TE_{01}^{\circ}$ wave will induce a clockwise propagating wave in guide 11 when viewed along the direction of wave propagation in guide 10. This is indicated by arrow 15.

While only one pair of coupling apertures are shown, additional pairs of apertures can be used, where each pair is longitudinally displaced from the next adjacent pair by an integral number $n$ of rectangular guide wavelengths, i.e., $n\lambda_{10}$. The total number of pairs used in any particular application, and the aperture size would depend upon the bandwidth required.

The circulating wave induced in guide 11 is directionally coupled out of guide 11 and into output waveguide 17. The latter is a dominant mode waveguide oriented with its narrow walls perpendicular to the narrow walls of guide 11 and with one wide wall 19 in contact with the outer wide wall 18 of waveguide 11. Here again, any one of the many cross-guide coupling arrangements can be used to couple wave energy between guides 11 and 17. For purposes of illustration, two apertures, spaced apart a quarter of a guide wavelength with respect to the direction of propagation in the respective waveguides, are used.

In operation, wave energy comprising a plurality of channels centered at frequencies $f_1, f_2 \ldots f_n$ is coupled into port 1 of filter 8 in the circular electric mode of wave propagation. At coupling apertures 13 and 14, that portion of the wave energy centered at frequency $f_1$ is coupled out of guide 10 and into the resonant loop 5 formed by guide 11. The rest of the channels continue along guide 10 and leave filter 8 at port 2.

The dropped channel is coupled out of resonant loop 5 through coupling apertures 16 and extracted from the output guide 17 through port 3. The other end of guide 17, port 4, is resistively terminated by means of a resistive wedge 20.

Figure 2:
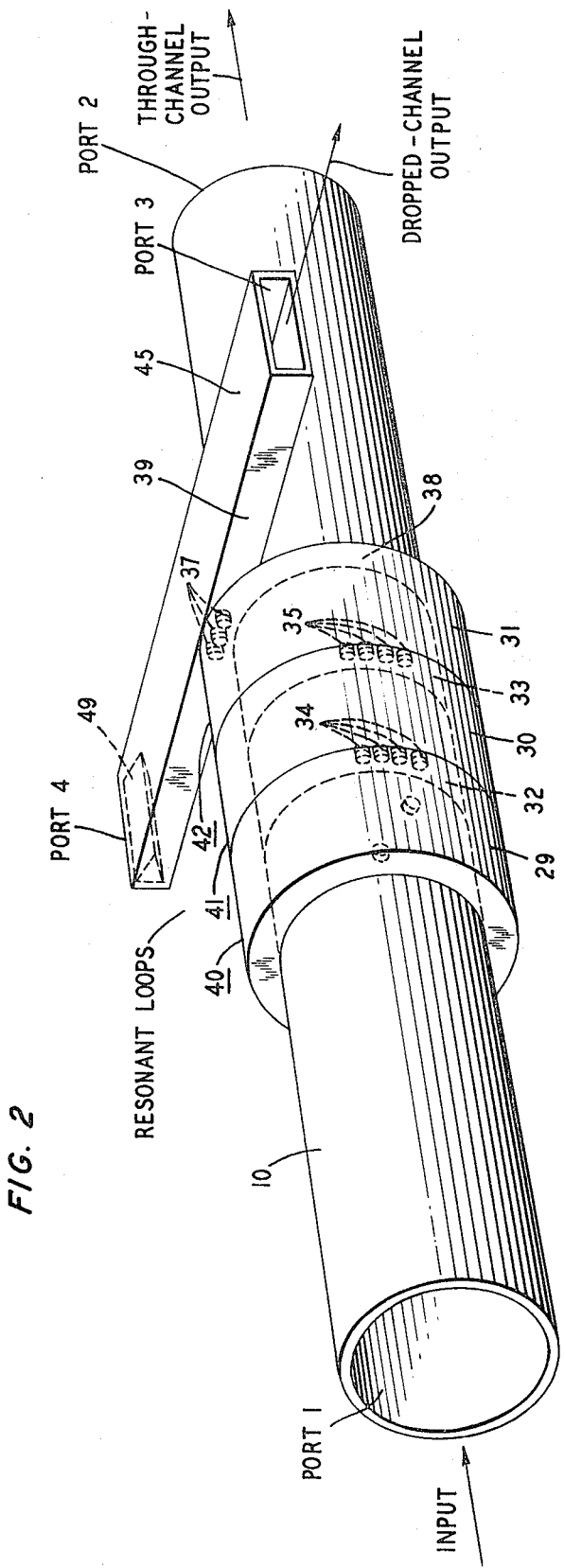
FIG. 2 shows a multiresonator four-port channel-dropping filter.

In the discussion hereinabove, it was indicated that the filter selectivity can be increased by cascading additional resonant cavities between the main waveguide and the dropped-channel output waveguide. FIG. 2 is illustrative of one embodiment of a filter in accordance with the present invention in which three resonant loops have been interposed in the manner indicated. Thus, the filter comprises three rectangular waveguides 29, 30, and 31 wrapped about the main waveguide 10 to form three loop resonators 40, 41, and 42, each of which has an electrical length equal to an integral number of rectangular guide wavelengths at the frequency of the channel to be dropped. The first of the three resonators along the direction of energy flow in guide 10 (i.e., resonator 40), is directionally coupled to the main waveguide in the manner described in connection with FIG. 1. Resonator 40 is, in addition, directionally coupled to the next successive loop resonator 41 which, in turn, is directionally coupled to the third resonator 42. In general, each intermediate resonator is directionally coupled to the immediately preceding resonator and to the next successive resonator. The last resonator 42 is directionally coupled to the dropped-channel output waveguide 45.

In the embodiment of FIG. 2, each of the resonators are contiguously disposed such that adjacent ones share a narrow wall in common. For example, resonators 40 and 41 share narrow wall 32 in common while resonators 41 and 42 share narrow wall 33 in common. Directional coupling between adjacent cavities is realized by means of a plurality of coupling apertures 34 and 35 distributed along the common narrow guide walls 32 and 33, respectively. The number and arrangement of the apertures is determined in accordance with design techniques well known in this art (see, for example, "Multi-Element Directional Couplers," by S. E. Miller and W. W. Mumford, published in the September 1952 issue of the Proceedings of the IRE, vol. 40, pages 1071–1078).

Output waveguide 45 is similarly disposed with respect to resonator 42 so that a portion of narrow wall 38 of the latter is contiguous with a portion of narrow wall 39 of guide 45. Wave energy in resonator 42 is directionally coupled into the output guide by means of coupling apertures 37 distributed along the region common to both. Depending upon the design of the directional couplers, power is extracted through either port 3 or 4 of guide 45. As illustrated, port 4 is resistively terminated by means of an absorptive wedge 49 and port 3 is the output port.

In addition to illustrating the use of a plurality of resonators to increase the filter selectivity, the embodiment of FIG. 2 also illustrates an alternative coupling arrangement for the output guide. In FIG. 1, the output guide was cross-coupled to the resonator through coupling apertures located in contiguous wide walls. In FIG. 2, the coupling is through a common region of narrow walls.

Figure 3:
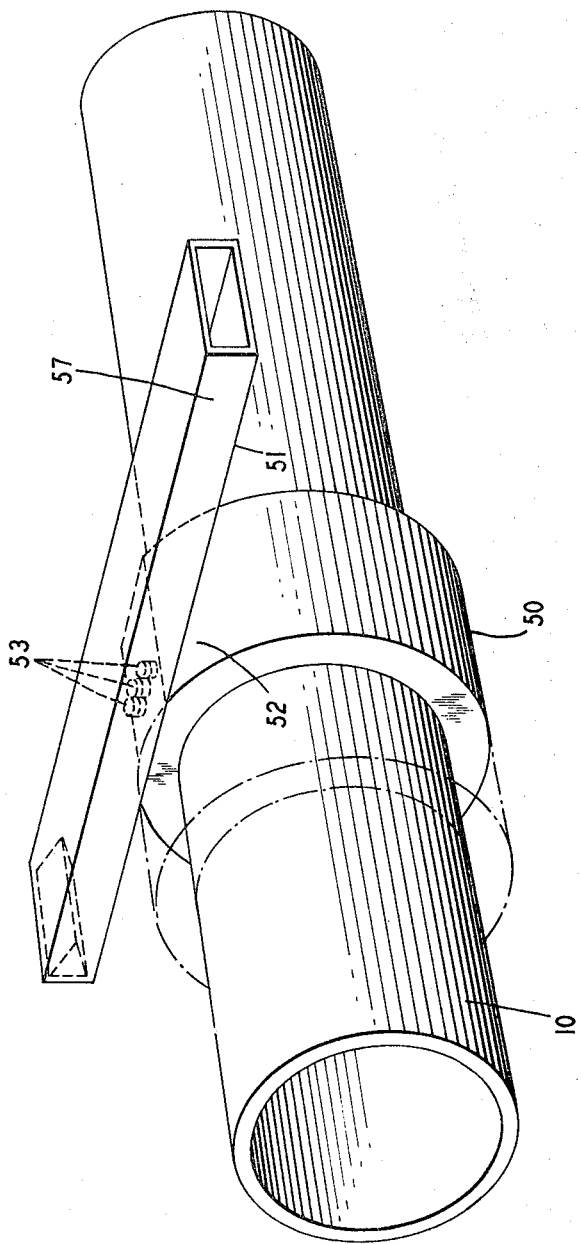
FIG. 3 shows an alternative arrangement for coupling the dropped-channel output waveguide to the last resonator.

FIG. 3 shows a third arrangement of the output waveguide 57 in which the latter is disposed with respect to the last resonator 50 such that the narrow walls of the two are parallel to each other, and one of the wide walls 51 of the guide is contiguous to a portion of the outer wide wall 52 of resonator 50. Directional coupling between the resonator and guide is achieved by means of a plurality of coupling apertures 53 longitudinally distributed along the portion of wide wall common to both. Clearly other coupling arrangements can be used in accordance with the particular circuit and physical requirements in each application.

It will be recognized that the use of three loop resonators in the embodiment of FIG. 2 is merely intended to be illustrative. Clearly fewer or more than three resonators can be used to satisfy other circuit requirements. Similarly, the use of rectangular waves is also illustrative. Thus, in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. In an electromagnetic wave transmission system supportive of wave energy in the $TE_{01}^{\circ}$ circular electric mode of propagation over a given frequency interval, a four-port channel-dropping filter for extracting a band of wave energy centered at a frequency $f_1$ within said interval comprising:
   a section of circular waveguide;
   at least one section of dominant mode rectangular waveguide wrapped about said circular guide to form a closed loop resonator whose electrical length is equal to an integral number of guide wavelengths at said frequency $f_1$;
   directional coupling means for coupling wave energy between said circular guide and said loop resonator;
   a dropped-channel output dominant mode waveguide;
   and means for directionally coupling said band of wave energy between said resonator and said output waveguide.

2. The filter according to claim 1 wherein a plurality of sections of waveguide are wrapped about said circular waveguide to form a plurality of loop resonators;

wherein the first of said loop resonators along the direction of energy flow in said circular waveguide is directionally coupled to said circular waveguide;

wherein the last of said loop resonators is directionally coupled to said output waveguide;

and wherein each loop resonator is directionally coupled to each next adjacent resonator.

3. The filter according to claim 2 wherein each loop resonator comprises a section of rectangular waveguide; and wherein adjacent resonators share a narrow wall in common.

References Cited
UNITED STATES PATENTS

| | | | |
|---|---|---|---|
| 2,963,663 | 12/1960 | Marcatili | 333—9 |
| 3,074,033 | 1/1963 | Smith | 333—73 X |

PAUL L. GENSLER, Primary Examiner

U.S. Cl. X.R.

333—10, 73